United States Patent [19]

Hashimoto et al.

[11] Patent Number: 4,587,635
[45] Date of Patent: May 6, 1986

[54] INFORMATION RETRIEVAL SYSTEM EQUIPPED WITH VIDEO DISK

[75] Inventors: Shintaro Hashimoto, Ikoma; Mitsuhiro Saiji, Nara, both of Japan

[73] Assignee: Sharp Kabushiki Kaisha, Osaka, Japan

[21] Appl. No.: 382,297

[22] Filed: May 26, 1982

[30] Foreign Application Priority Data

May 29, 1981 [JP]  Japan ................................. 56-82742
Jul. 1, 1981 [JP]   Japan ................................ 56-103828

[51] Int. Cl.⁴ ............................................. G06F 9/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,781,809 | 12/1973 | Murakoshi et al. | 340/172.5 |
| 3,792,440 | 2/1974 | Murakoshi | 340/172.5 |
| 4,122,533 | 10/1978 | Kubinak | 364/900 |
| 4,139,898 | 2/1979 | Tanaka | 364/900 |
| 4,142,209 | 2/1979 | Hedlund et al. | 358/128 |
| 4,158,236 | 6/1979 | Levy | 364/200 |
| 4,161,753 | 7/1979 | Bailey et al. | 358/336 |
| 4,213,163 | 7/1980 | Lemelson | 360/35 |
| 4,229,808 | 10/1980 | Hui | 365/235 |
| 4,412,305 | 10/1983 | Yoshida | 364/900 |

OTHER PUBLICATIONS

"Special Purpose Applications of the Optical Videodisc System", George C. Kenney, IEEE Transactions on Consumer Electronics, 11/76.

"A Random Access System Adapted for the Optical Videodisc: Its Impact on Information Retrieval", Michael Mathieu, SMPTE Journal, Feb. 1977, vol. 86, 358,342.

U.K. patent application 2014765 to Son et al., Aug. 30, 1979, Portable Translator Device.

Primary Examiner—Gareth D. Shaw
Assistant Examiner—John G. Mills
Attorney, Agent, or Firm—Birch, Stewart, Kolasch & Birch

[57] ABSTRACT

An information retrieval system adapted for an electronic dictionary comprises an input device actuated for entering an entry word, a memory adapted for storing a word equivalent to the entry word and the number of a track related to the word a video disk for recording information related to the word and voice data related to the word, the information and the voice data being randomly accessed, and an access circuit responsive to the number of the track specified by the memory for accessing the video disk to access the information from the video disk. The access circuit is operated to automatically provide the voice data when the video disk is operated to provide the new kind of information or, otherwise, to selectively provide the voice data while the video disk is operated to display a particular picture.

8 Claims, 14 Drawing Figures

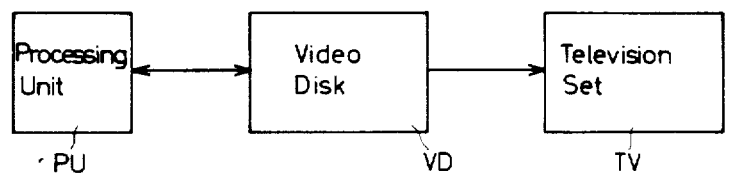
FIG. 1
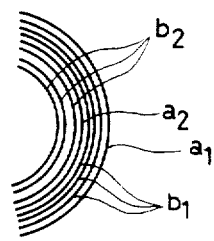
FIG. 2
| Frame No. | Spelling | Track No. |
|---|---|---|
| 0 | a | 00010 |
| 1 | aboard | 00015 |
| 2 | about | 00022 |
| 3 | ' | ' |
| ' | ' | ' |
| ' | ' | ' |
| ' | ' | ' |
| | ' | ' |
| | ' | ' |
| | ' | ' |
| | ' | ' |
| | zoom | 45020 |
FIG. 3

FIG.4(A)

a
abide
ability
able abnormal

FIG.4(B)

aboard
abode
abolish
dbolition
A-bomb
abound

FIG.4(C)

about above aboroad
absence

INFORMATION RETRIEVAL SYSTEM EQUIPPED WITH VIDEO DISK

BACKGROUND OF THE INVENTION

The present invention relates to an information retrieval system and, more particularly, to an information retrieval system equipped with a randomly-accessible memory medium such as a video disk.

Recently, electronic devices called electronic dictionaries have become available on the market. These electronic dictionaries require efficient and rapid retrieval of word information stored in a ROM. An example of such electronic dictionaries is disclosed in Levy U.S. Pat. No. 4,158,236, June 12, 1979, "ELECTRONIC DICTIONARY AND LANGUAGE INTERPRETER". The disclosure of this patent is incorporated herein by reference.

However, the capacity of a ROM is rather small.

The present invention is concerned with the use of a video storage medium, such as a video disk, as part of an improved information retrieval system. A video storage medium allows large quantities of information to be stored and rapidly accessed. The information may be stored in the form of video data, in which case the information can be displayed on a video monitor.

In a video disk, information such as word information is memorized in the form of digital codes. Careful consideration should be directed to the problem that dust on the video disk may cause errors in reading out information from the video disk.

Further, when the video disk provides a still picture, the same tracks of the video disk are repeatedly traced, so that it was impossible to speak, as one reads, with the word information. This would be a disadvantage for the electronic dictionary.

Since, in a single track of the video disk, the visual signals forming a single, still television picture, the aural signals and the address signals are superimposed, the repetition of the tracing on the same single track provides the single still television picture. However, because the round length of the single track can be traced for a very short time, about $30^{-1}$ to $60^{-1}$ sec., the data of the aural signals developed in accordance with the tracing of the single track are too small to provide pronunciation, as one reads, with the data. The reproduction of the data therefore may merely cause noise.

A system of the present invention is preferably designed to avoid the above discussed problems.

SUMMARY OF THE INVENTION

Accordingly, it is an object of the present invention to provide an improved information retrieval system equipped with a video disk.

It is another object of the present invention to provide an improved electronic dictionary for developing word information stored in a video disk.

It is a further object of the present invention to provide an improved electronic dictionary for developing a still picture and automatically providing voice information related to the still picture in response to forward and backward selection of the still picture.

Briefly described, in accordance with the present invention an information retrieval system adapted for an electronic dictionary comprises an input means actuated for entering an entry word, a memory means adapted for storing a word equivalent to the entry word and the number of a track related to the word, a video disk means for recording information related to the word and voice data related to the word, the information and the voice data being randomly accessed, and an access means responsive to the number of the track specified by the memory means for accessing the video disk means to access the information therefrom. The access means is operated to automatically provide the voice data when the video disk means is operated to provide the new kind of information or, otherwise, to selectively provide the voice data while the video disk means is operated to display a particular picture.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 shows an information retrieval system adapted for an electronic dictionary according to the present invention;

FIG. 2 shows tracks of a video disk for recording information the video disk being connected to form the system of FIG. 1;

FIG. 3 shows the contents of a memory unit contained in a processing unit of FIG. 1 in a preferred form of the present invention;

FIGS. 4(A) to 4(C) show an exemplary picture displayed on a screen of a television set in FIG. 1;

DESCRIPTION OF THE PRESENT INVENTION

The video disk is adapted for an information retrieval system including an electronic dictionary according to the present invention. With the randomly accessible memory feature of the video disk, it is used as a memory for storing data such as word information in the electronic dictionary.

The video disk records television visual signals, aural signals and address signals all superimposed on an optical or another type of disk in a modulated form as a row of pits. Each disk can record television picture signals for providing several tens of thousands of television pictures. Moving pictures can be outputted by accessing the respective address signals. When the pictures are continuously read out, they can provide voice information to speak.

In the video disk adapted for the present invention, the digital codes in addition to the visual signals are recorded after modulated in a pulse-code modulation (PCM). The video disk reader employs a laser beam to read indentations on the disk and produces the television pictures and the sound, which is adapted for the present invention.

FIG. 1 shows an information retrieval system adapted for an electronic dictionary according to the present invention. According to a preferred embodiment of the present invention, the electronic dictionary is referred to an English-English dictionary. It may be evident that any other type of language dictionary can be provided within the spirit and the scope of the present invention.

The information retrieval system of FIG. 1 comprises a processing unit PU, a video disk VD, and a television set TV. The processing unit PU is provided for inputting the spelling of a particular word processed in the electronic dictionary. By actuating necessary key operations as will be described below, tracks of the video disk are accessed to provide the visual and aural information into the television set.

FIG. 2 shows the tracks of the video disk for recording the television visual signals, the aural signals and the address signals.

In FIG. 2, each of "$a_1$" and "$a_2$" indicates a single track for recording a single and full still television picture to show a plurality of words. Each of "$b_1$" and "$b_2$" indicates tracks for recording voice information corresponding to each of the words contained in "$a_1$" and "$a_2$".

Figure 5:
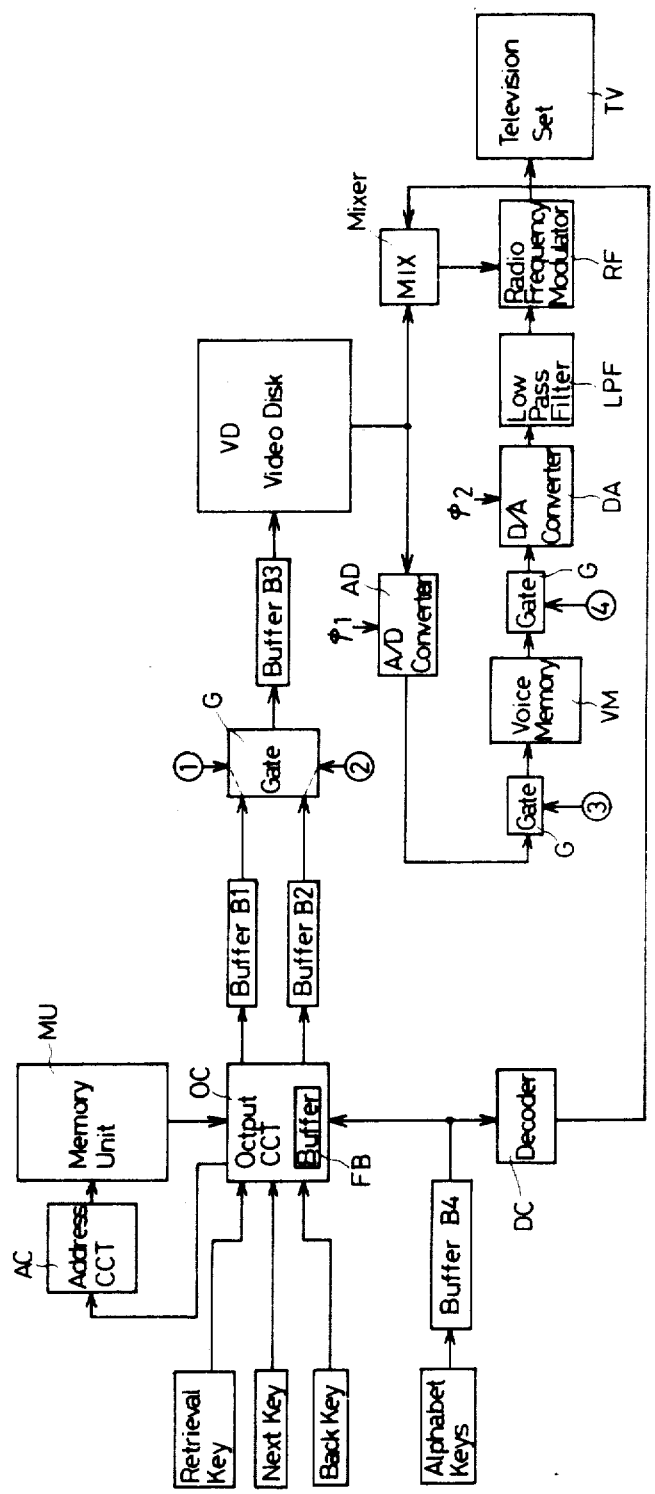
FIG. 5 shows a block diagram of circuits of the processing unit and the video disk in the system of FIG. 1 in the preferred form of the present invention.

FIG. 3 shows the contents of a memory unit MU contained in the processing unit PU. The format of FIG. 3 is recorded in the memory unit as can be seen in FIG. 5. Preferably, this memory unit is a ROM.

FIGS. 4(a) to 4(C) show exemplary television pictures displayed on a screen of the television set TV. When a specific English word "able" is inputted and selected, the picture of FIG. 4(a) is displayed. Although not indicated specifically the entry words and the description related to the entry words can be displayed, of course.

As can be seen by comparing FIG. 3 and FIGS. 4(A) to 4(C), the memory unit stores a plurality of pairs of the spelling of the word to be displayed at the head of each of pictures and the track no. of the track in which the picture is recorded in the disk. More particularly, the picture of FIG. 4(A) (frame no. "0") is recorded in the track of track no. "00010", the picture of FIG. 4(B) (frame no. "1") is recorded in the track of track no. "00015" (frame no. "1") and the picture of FIG. 4(C) frame no. "2") is recorded in the track of track no. "00022".

FIG. 5 shows a block diagram of the circuit of the processing unit PU.

In FIG. 5, the video disk is denoted as VD and the television set is denoted as TV. The key switches contained within the processing unit PU are alphabet keys, a next key, a back key and a retrieval key. The alphabet keys are actuated to enter the spellings of entry words. The retrieval key is actuated to retrieve the word data from the memory unit MU.

The next key is actuated to count up the frame no. in the memory unit MU. The back key is actuated to count down the frame no. in the memory unit MU.

The memory unit of FIG. 3 is indicated by MU. An address circuit for accessing the memory unit MU is denoted as AC. An output circuit for controlling the output from the memory unit MU is denoted as OC. The output circuit OC includes a buffer FB for storing the frame no. Buffers $B_1$ and $B_2$ buffer the track no. read out of the memory unit MU. A gate G is responsive to the input of micro orders ① and ② to select a buffer $B_1$ or $B_2$ so as to input the information into a buffer $B_3$. A buffer $B_4$ is responsive to the actuation of the alphabet keys to buffer letter codes generated in accordance with the actuation of the alphabet keys.

A decoder DC is provided for decoding the contents of the buffer $B_4$ so that the contents are superimposed in the picture of the television set TV. An A/D converter AD is provided for converting analog data into digital data. Gates G are provided to control the transfer of information to and from a voice memory VM which is provided for storing voice data generated from the video disk VD. A D/A converter is provided for converting the digital data into the analog data. A low pass filter LPF, and a radio frequency modulator RF are provided. A mixer MIX is provided for mixing the data from the video disk VD and the data inputted by the alphabet keys.

FIGS. 6(A) to 6(D) are flowcharts of the operation of the system of FIG. 5. Although not shown, a sequential controller may be provided in the circuit of FIG. 5 for generating four micro orders ① to ④. These micro orders are applied to the respective circuit elements as shown in FIG. 5. These micro orders are referred to the related steps of the flowchart of FIG. 6(A).

With reference to the flowcharts of FIGS. 6(A) to 6(D), the operational steps of the circuit of FIG. 5 are as follows;

$n_1 \rightarrow n_2 \rightarrow n_3 \rightarrow n_4$: Upon application of an electric source, the initial television picture is accessed and displayed. The initial television picture is to explain the operating method of the present electronic dictionary. The information for the initial television picture is recorded on a certain track.

The spelling of a certain entry word is inputted by actuating the alphabet key switches. The code representative of the spelling is applied to the buffer $B_4$, so that the spelling of the entry word is displayed on the television screen. That is, the contents of the buffer $B_4$ are decoded by the decoder DC and the spelling of the entry word is superimposed on the television screen by the mixer MIX.

The video signal generated from the video disk VD is also transferred to the radio frequency modulator RF through the mixer MIX.

$n_5 \rightarrow n_6$: After the entry word has been inputted, the retrieval key is actuated, so that the entry word is retrieved from the memory unit MU.

$n_7 \rightarrow n_8 \rightarrow n_9$: When a word corresponding to the entry word is detected, the track no. related to the word is applied to the buffer B 1. The track corresponding to the track no. detected is picked out from the video disk VD so that the information contained within the track is displayed.

Figure 6A:
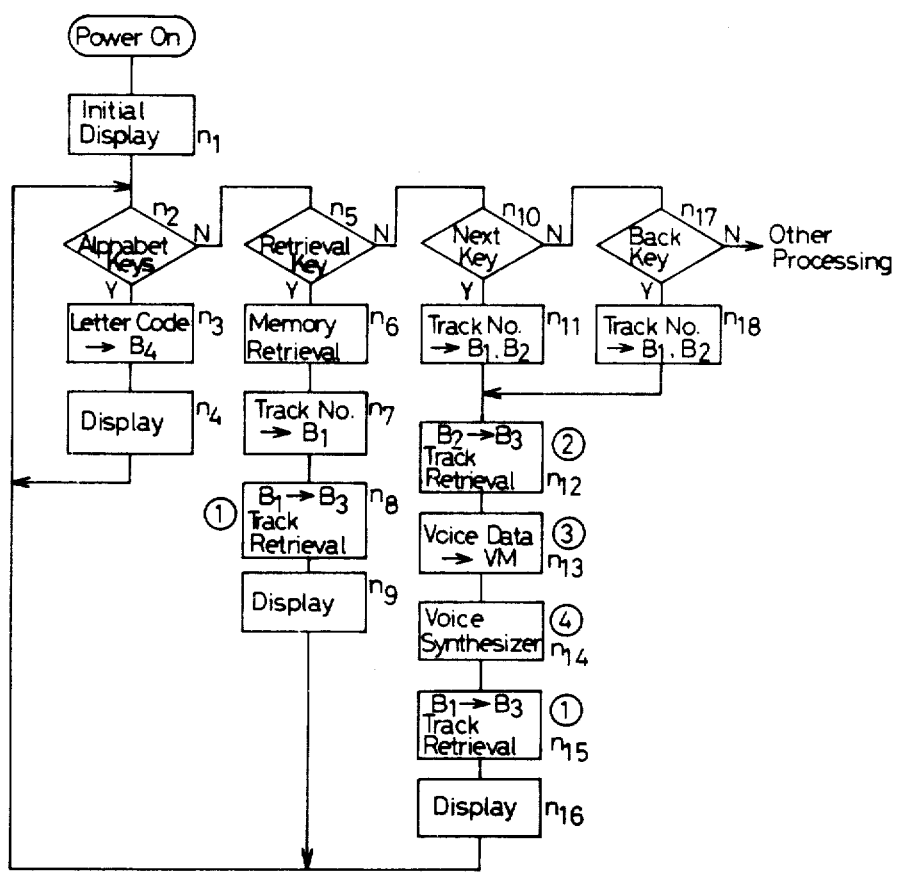
FIGS. 6(A) to 6(D) show flowcharts of the operation of the system as shown in FIG. 1 in the preferred form of the present invention.
Figure 6B:
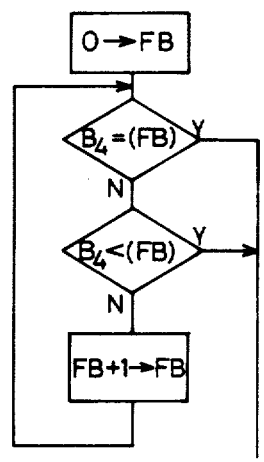

FIG. 6(B) shows a flowchart representing the retrieval method in step $n_6$. Firstly, the frame no. is set to "0". The spelling of the entry word applied to the buffer $B_4$ is compared with the spelling of the heading word specified by the frame no. When they do not agree to each other, whether the word corresponding to the entry word inputted precedes the heading word specified by the frame no. or not is detected by referring to the alphabetical arrangement of the entry word. By repeating these procedures, the track no. of the picture containing the word equivalent to the entry word inputted is detected. There may be possibility that the word equivalent to the entry word is not found.

Turning back to FIG. 6(A), $n_{10} \rightarrow n_{11}$: When a picture next to the picture which is displayed is to be displayed, the next key is actuated. Therefore, the track no. corresponding to the next picture is applied to the buffer $B_1$. The track no. of the track in which the voice data corresponding to the next picture is recorded is introduced into the buffer $B_2$.

$n_{12} \rightarrow n_{13} \rightarrow n_{14}$: The voice data is read in the voice memory VM to initiate the voice synthesizing operation.

$n_{15} \rightarrow n_{16}$: The track specified by the track no. stored in the buffer $B_1$ is picked out to display the picture.

The voice data is stored with time compression. The voice data is stored in the voice memory VM as digital information using a clock $\phi_1$ the voice data are read out using a clock $\phi_2$ which is slower than the clock $\phi_1$ for time expansion, and the data is converted from the digital information into analog information.

Figure 6C:
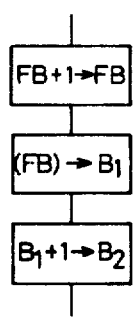

FIG. 6(C) shows a flowchart representing the method of determining the track no. in the step $n_{11}$. In FIG. 6(C), the buffer FB for storing the frame $n_o$. is counted up so that the track no. corresponding to the incremented frame no. is applied to the buffer $B_1$. The track no. following the track no. presently stored in the buffer $B_1$ is applied to the buffer $B_2$.

Figure 6D:
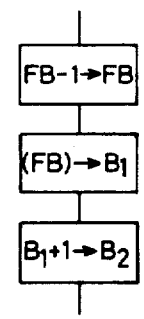

When the back key is actuated, the frame no. is counted down as shown in FIG. 6(D). The track nos. for the voice data and the visual data are set in the buffers $B_1$ and $B_2$, respectively. The tracks for the voice data and the visual data are arranged in the following manner. In the case of FIG. 4(A), the track for recording the visual data is followed by the tracks for recording the voice data for the respective words. Each of the tracks record the voice data for each of the words in order. Following the track for recording the visual data, the voice data for the words "a", "abide", "ability", "able", and "abnormal" are recorded. Further following the information, the tracks are provided for recording the picture of FIG. 6(B), and the words "aboard" and "abode".

When the picture of FIG. 4(A) is selected and displayed, the voice data of the heading word "a" are automatically generated by the voice synthesizing operation upon selection of the picture of FIG. 4(A). It may be possible that the remaining words "abide", "ability", "able" and "abnormal" can be generated by the voice synthesizing operation.

According to the above described preferred embodiment of the present invention, in the retrieval system for selecting a forward picture and/or a backward picture, the voice data of the heading word in a newly selected picture can be automatically generated by the voice synthesizing operation upon selection of the forward picture of the backward picture. The picture provides a plurality of entry words and the description related to the words.

The voice synthesizing operation of the entry words can be completed before the operator fully reads the picture displayed. Therefore, some unnecessary pictures can be skipped before the operator reads the full contents of the picture displayed. The track for the visual information is positioned adjacent to the tracks for the voice data related to the visual information.

In another preferred embodiment of the present invention, the voice data to be generated can be selected among the data for a plurality of entry words in a particular picture while a still picture is displayed continuously.

Figures 7, 8:
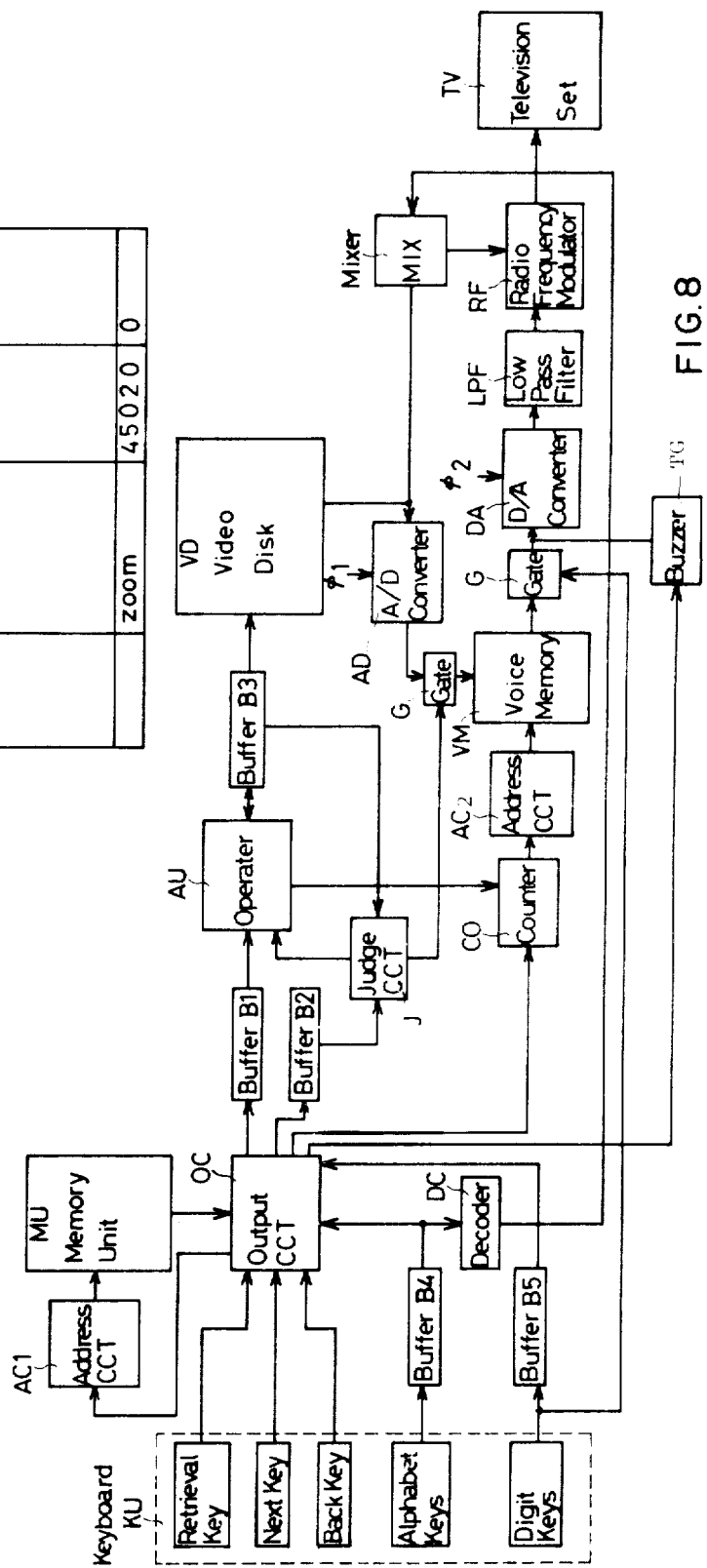
FIG. 7 shows the contents of the memory unit contained in the processing unit of FIG. 1 in another preferred form of the present invention
FIG. 8 shows a block diagram of the processing unit and the video disk in another preferred form of the present invention.

FIG. 7 shows the contents of the memory unit MU in the processing unit PU. With reference to FIGS. 4(A) to 4(C) and FIG. 7, the memory unit stores a plurality of pairs of the spelling of the word to be displayed at the head of each of the pictures and the track no. of the track in which the picture is recorded in the disk. The picture of FIG. 4(A) (frame no. "1") is recorded in the track of track no. "00010", the picture of FIG. 4(B) (frame no. "2") is recorded in the track of track no. "00014", and the picture of FIG. 4(C) (frame no. "3") is recorded in the track of track no. "00015".

Further, in FIG. 7, a voiced no. is provided for indicating the number of the entry word that is accompanied by the voice data among the entry words in each of the pictures. For example, the picture of frame no. "1" includes five entry words as shown in FIG. 4(A). The voiced no. "145" related to frame no. "1" represents that the first entry word "a", the fourth entry word "able" and the fifth entry word "abnormal" have the voice data in the video disk. The remaining words do not have voice data recorded in the disk.

In a specific example, while the picture of FIG. 4(A) is displayed, a specific digit key, for example, "4" is actuated to provide the voice synthesizing operation for the fourth entry word "able".

Figure 9:
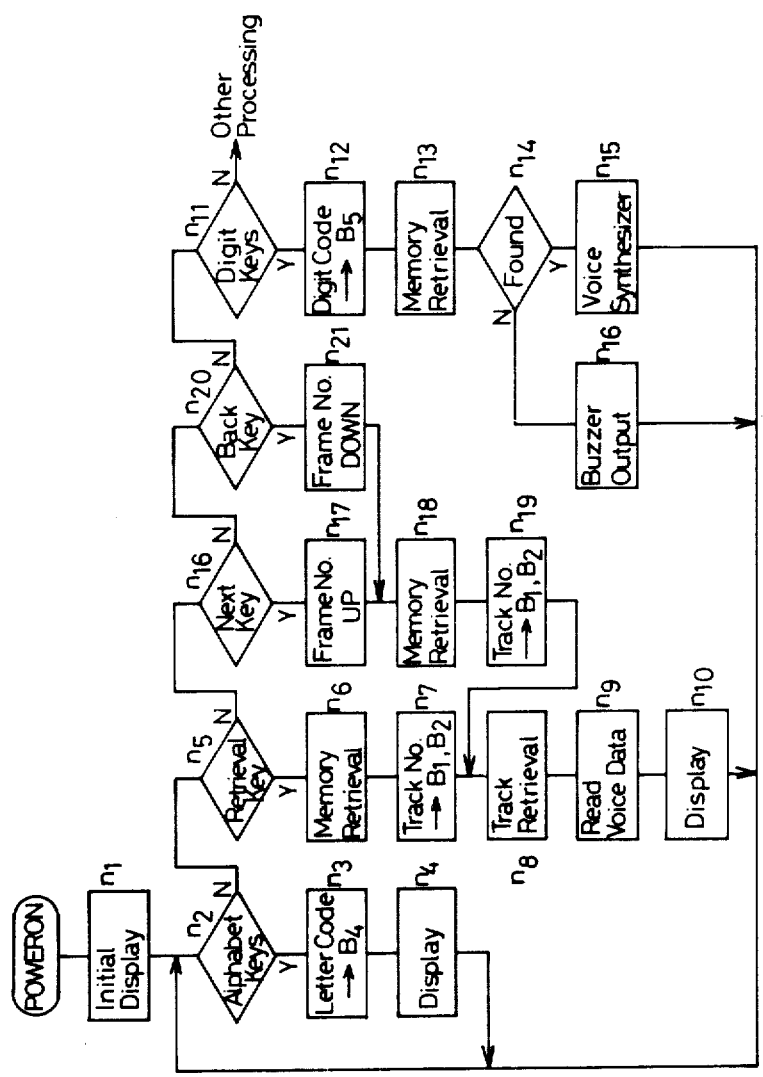
FIG. 9 shows a flowchart of the operation of the video disk in another preferred form of the present invention.

FIG. 8 shows another block diagram of the circuits of the processing unit PU and the video disk VD. FIG. 9 shows a flowchart of the operation of the system of FIG. 8.

The circuit of FIG. 8 is similar to that of FIG. 5 except that digit keys, a buffer $B_5$, a counter CO, an address circuit $AC_2$, a judge circuit J, a gate G and a buzzer TG are additionally connected.

A keyboard KU contains the retrieval key, the next key, the back key, the alphabet keys and the digit keys. The digit keys are actuated to introduce digit information. MU indicates a memory unit for storing the information for the frame no., the spelling, the track no., and the voiced no. as shown in FIG. 7. An address circuit $AC_1$ is provided for addressing the memory unit MU.

Five buffers $B_1$ to $B_5$ are provided. The buffer $B_1$ stores the track no. read out of the memory unit MU. The buffer $B_2$ stores the track no. of the next picture. The buffer $B_3$ stores the track no. of the present picture. The buffer $B_4$ stores the letter codes representative of the spelling of the entry word inputted by the alphabet keys. The buffer $B_5$ buffers the digit codes representative of the digit information inputted by the digit keys.

The operator AU is provided for operating on the contents in the buffers $B_1$ and $B_2$. The judge circuit J is provided for detecting the equivalency between the contents of the buffer $B_2$ and those of the buffer $B_3$. The address circuit $AC_2$ is provided for addressing the voice memory VM. The buzzer TG is provided for generating electronic sound buzzer information entry word having no voice data is selected.

The operation of the circuit of FIG. 8 will be described with reference to the flowchart of FIG. 9.

$n_1$: When the power source is connected, the initial display is accessed.

$n_3$: When the spelling of a desired word is inputted by actuating the alphabet keys, the letter codes are entered to the buffer $B_4$.

$n_4$: The letter codes are decoded by the decoder DC, so that the word inputted is superimposed on the picture through the mixer MIX.

The visual information generated from the video disk VD is displayed on the screen of the television set TV through the radio frequency modulator RF.

$n_5$: After the spelling of the desired word is inputted, the retrieval key is actuated.

$n_6$: The word having the spelling inputted is retrieved from the memory unit MU.

$n_7$: The track no. corresponding to the spelling of the word is introduced into the buffer $B_1$ and the track no. of the next picture is introduced into the buffer $B_2$.

$n_8$: The tracks of the video disk VD are retrieved using the track no. selected.

$n_9$: The voice data from the video disk VD are converted from analog information to digital information by the A/D converter AD so that the results are entered to the voice memory VM (for example, RAM).

As shown in FIGS. 2 and 7, in the tracks between the picture to be sought and the next picture, the voice data related to the picture to be sought are recorded. The voice data are read in by the voice memory VM, subsequently.

More particularly, "1" is added to the contents of the buffer $B_1$ through the operator AU. The results are inputted into the buffer $B_3$. The contents of the buffer $B_2$ and those of the buffer $B_3$ are compared. The buffer $B_3$ stores the results of the addition of the track no. in the buffer $B_1$ and "1". The contents of the buffer $B_3$ and those of the buffer $B_2$ for storing the track no. of the next picture are compared. When the contents of the buffer $B_2>$ those of the buffer $B_3$ (meaning that the track selected is positioned between the picture to be sought and the next picture), the counter CO is set to be "1" and the track equivalent to the contents of the buffer $B_3$ is picked out from the video disk to enter it into the voice memory VM.

Secondarily, "1" is added to the contents of the buffer $B_3$. The results in the buffer $B_3$ and the contents of the buffer $B_2$ are compared. When $B_2>B_3$, "1" is added into the contents of the counter CO. The track equivalent to the contents of the buffer $B_3$ is picked out from the video disk VD to enter the picked information to the voice memory VM. These procedures are repeated till $B_2=B_3$ is confirmed.

$n_7 \rightarrow N_8 \rightarrow n_9 \rightarrow n_{10}$: The voice data are recorded with time compression in the disk. The data are converted into the digital data using the clock $\phi_1$ to enter the data into the voice memory VM. The data are generated from the memory using the slow clock $\phi_2$. After the data are entered to the voice memory VM, the picture to be sought is displayed.

$n_{11}$: One of the digit keys is actuated to input and select a desired digit "N".

$n_{12}$: The code representation of the digit is applied to the buffer $B_5$.

$n_{13}$: The memory unit MU is retrieved to detect whether the entry word directed by the digit has the voice data or not. As FIG. 7 shows, the fourth entry word in the frame no. "1" has the voice data and the fourth entry word is the second word to be spoken. Therefore, when a digit "4" is inputted as to the frame no. "1", "2" is applied to the counter CO.

$n_{11} \rightarrow n_{12} \rightarrow n_{13} \rightarrow n_{14} \rightarrow n_{15}$: The voice data in the voice data VM are selected and read out. That is, the word "able" is pronounced by the voice synthesizing operation.

$n_{14} \rightarrow n_{16}$: When the entry word having no voice data is selected, the buzzer TG (for example, ROM) is operated to provide the electronic sound.

$n_{16} \rightarrow n_{17} \rightarrow n_{18} \rightarrow n_{19}$: To increment the picture by 1, the next key is operated as described above. To back up the picture by 1, the back key is operated. When the next key is operated, the track no. equivalent to the next picture frame no. is inputted to the buffer $B_1$. The track no. equivalent to the further next picture frame no. is inputted to the buffer $B_2$. With the information of the track no., the picture is displayed after the voice data are read in.

Thus, according to another preferred form of the present invention, the digit keys are actuated to select the entry word whose voice data are voice synthesized, among the words in the picture displayed. It may be needless to say that the description as to the displayed picture and any other information can be voice synthesized. Further, within the knowledge of the present invention, the following modifications can be possible:

1. In place of ROM, the memory unit can comprise a magnetic bubble memory or a mini-floppy disk memory which stores a great amount of data.

2. In place of the video disk using the laser beam in the above preferred embodiment, any other type of video disk including a type having electrostatic capacity can be adapted for the present invention.

3. In addition to the English-English dictionary or any other language dictionary, the present invention can be adapted for any dictionary including an encyclopedia.

While only certain embodiments of the present invention have been described, it will be apparent to those skilled in the art that various changes and modifications may be made therein without departing from the spirit and scope of the invention as claimed.

What is claimed is:

1. An information retrieval system for use as an electronic dictionary comprising:

information disk means for recording information related to words to be defined or translated, said disk means having a plurality of concentric information tracks, said information including picture information and audio information related to each said word, said picture information and audio information being stored on separate information tracks of said disk means;

input means for entering an entry word to be defined or translated;

memory means for storing each said word to be defined or translated having related information stored on said video disk means as well as track numbers of the information tracks of said disk means having said picture information and audio information stored therein;

means, responsive to said entered word, for searching said memory means to locate and recall said track numbers on said disk means where said picture and audio information related to said entry word can be located;

first buffer means, responsive to said means for searching, for temporarily storing the track number where said picture information is located;

second buffer means, responsive to said means for searching, for temporarily storing the track number where said audio information is located;

third buffer means, operatively connected to said means for reading, for temporarily storing a said track number to be read from said video disk means;

means, responsive to entry of a said track number stored in said third buffer means, for reading the selected said track of said video disk means to read out the information recorded therein;

voice memory means, operatively connected to said means for reading, for temporarily storing audio information read from said video disk means in response to selection of a said track having audio information thereon;

means, responsive to said audio information stored in said voice memory means, for developing audible voice information related to said entry word;

gate means, operatively interconnected between said third buffer means and said first and second buffer means, for selectively transferring the contents of said first buffer means or said second buffer means to said third buffer means;

means for controlling the operation of said gate means to first transfer the contents of said second buffer means to said third buffer means to facilitate temporary storage of said audio information related to said entry word in said voice memory means and subsequently transfer the contents of said first buffer means to said third buffer means to read out picture information therefrom, means, responsive to said means for reading, for displaying said picture information;

said control means further enabling said means for developing audible voice information simultaneously to display of said picture information by said means for displaying.

2. The system of claim 1, wherein said means for displaying comprises a television set means for displaying a television picture.

3. The system of claim 2, wherein said video disk means is adapted to provide information for displaying a still picture or moving pictures on the television set.

4. The system of claim 1, wherein said audible information is automatically generated when the video disk means is operated and first recites the entry word for specifying the information related to the word.

5. The system of claim 1, wherein said memory means stores an indication whether the entry word has audio information stored therewith.

6. The system of claim 1, wherein the input means comprises;
  alphabet key switches actuated to enter the entry word;
  a retrieval key switch actuated to retrieve the entry word from the video disk means;
  a next key switch actuated to recall a word next to the entry word in the memory means; and
  a back key switch actuated to recall a word back from the entry word in the memory means.

7. The system of claim 2, wherein the entry word is superimposed in the television picture for displaying the information retrieved from the video disk means.

8. The system of claim 1, wherein the memory means comprises a read-only memory, a random access memory, a bubble memory or a floppy disk member.

* * * * *